United States Patent
Kobayashi

(10) Patent No.: US 12,105,495 B2
(45) Date of Patent: Oct. 1, 2024

(54) PROGRAM GENERATION DEVICE, PROGRAM GENERATION DEVICE CONTROL METHOD, AND RECORDING MEDIUM

(71) Applicant: OMRON Corporation, Kyoto (JP)

(72) Inventor: Yoshiaki Kobayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 526 days.

(21) Appl. No.: 17/278,668

(22) PCT Filed: Oct. 2, 2019

(86) PCT No.: PCT/JP2019/038962
§ 371 (c)(1),
(2) Date: Mar. 23, 2021

(87) PCT Pub. No.: WO2020/071439
PCT Pub. Date: Apr. 9, 2020

(65) Prior Publication Data
US 2022/0035331 A1    Feb. 3, 2022

(30) Foreign Application Priority Data

Oct. 4, 2018  (JP) ................................ 2018-189375

(51) Int. Cl.
G05B 19/05    (2006.01)
G06F 16/25    (2019.01)

(52) U.S. Cl.
CPC ......... *G05B 19/056* (2013.01); *G06F 16/258* (2019.01); *G05B 2219/13004* (2013.01)

(58) Field of Classification Search
CPC ........ G05B 19/056; G05B 2219/13004; G05B 19/05; G06F 16/258
See application file for complete search history.

(56) References Cited

U.S. PATENT DOCUMENTS

| | | | |
|---|---|---|---|
| 6,446,202 B1 * | 9/2002 | Krivoshein | H04L 41/0853 713/1 |
| 6,449,715 B1 * | 9/2002 | Krivoshein | G05B 19/4185 713/1 |
| 6,867,749 B1 * | 3/2005 | Il | G05B 19/0421 709/200 |

(Continued)

FOREIGN PATENT DOCUMENTS

| | | |
|---|---|---|
| CN | 104067186 | 9/2014 |
| JP | 2008129922 | 6/2008 |

(Continued)

OTHER PUBLICATIONS

"Search Report of Europe Counterpart Application", issued on Jun. 7, 2022, p. 1-p. 8.

(Continued)

*Primary Examiner* — Charles R Kasenge
(74) *Attorney, Agent, or Firm* — JCIPRNET

(57) ABSTRACT

An objective of the present invention is to simplify generation of a program for carrying out data collection performed by a PLC and reduce the burden on an operator. The invention comprises: a device information library (111) which stores program templates corresponding to various process relating to data collection and, for each target device from which data is to be collected, device parameters corresponding to said target device; and a program generation unit (117) which generates a data collection program using program templates and device parameters corresponding to an accepted target device.

8 Claims, 12 Drawing Sheets

(56) References Cited

U.S. PATENT DOCUMENTS

| | | | |
|---|---|---|---|
| 2003/0033037 A1* | 2/2003 | Yuen | G05B 19/0426 700/86 |
| 2003/0045950 A1* | 3/2003 | Bronikowski | G06F 8/20 700/86 |
| 2005/0228517 A1 | 10/2005 | Tomita | |
| 2008/0127065 A1 | 5/2008 | Bryant et al. | |
| 2013/0191669 A1 | 7/2013 | Schultze et al. | |
| 2015/0220076 A1* | 8/2015 | Uchida | G05B 19/05 700/97 |
| 2017/0262436 A1* | 9/2017 | Uchida | G06F 16/93 |

FOREIGN PATENT DOCUMENTS

| | | |
|---|---|---|
| JP | 2009230606 | 10/2009 |
| JP | 2012079246 | 4/2012 |
| JP | 2013016021 | 1/2013 |
| JP | 2013033479 | 2/2013 |
| JP | 2017142767 | 8/2017 |

OTHER PUBLICATIONS

"International Search Report (Form PCT/ISA/210) of PCT/JP2019/038962", mailed on Nov. 26, 2019, with English translation thereof, pp. 1-2.

"Written Opinion of the International Searching Authority (Form PCT/ISA/237) of PCT/JP2019/038962", mailed on Nov. 26, 2019, with English translation thereof, pp. 1-6.

"Office Action of China Counterpart Application", issued on Jan. 17, 2024, with English translation thereof, pp. 1-16.

\* cited by examiner

| device model/port | device variable | industrial quantity variable | industrial quantity | unit | communication port | physical quantity channel |
|---|---|---|---|---|---|---|
| | | | | | | |
| | | | | | | |
| | | | | | | |
| | | | | | | |
| | | | | | | |
| | | | | | | |
| | | | | | | |

113

| apparatus type | manufacturer | apparatus format | Rev |
|---|---|---|---|
| ▼ | ▼ | | |
| | | | |
| | | | |
| | | | | apparatus setting ▼

FIG. 6

PROGRAM GENERATION DEVICE, PROGRAM GENERATION DEVICE CONTROL METHOD, AND RECORDING MEDIUM

CROSS-REFERENCE TO RELATED APPLICATION

This application is a 371 of international application of PCT application serial no. PCT/JP2019/038962, filed on Oct. 2, 2019, which claims the priority benefit of Japan application no. 2018-189375, filed on Oct. 4, 2018. The entirety of each of the above-mentioned patent applications is hereby incorporated by reference herein and made a part of this specification.

BACKGROUND

Technical Field

The disclosure relates to a device that automatically generates a program for a PLC which controls a machine.

Related Art

A programmable logic controller (PLC) is a control device which makes an apparatus to be controlled perform machine processing or acquires information detected by a detection device in a factory or a plant. The PLC is widely used for factory automation (FA) at a production site where parameters such as a type, an order, a timing and the like of an apparatus to be operated need to be appropriately set.

Data transmitted to the PLC by a FA apparatus is varied. In order for the PLC to manage this wide variety of data in a unified manner, the received data is managed by performing conversion such as linear conversion or the like.

In addition, in order to control the FA apparatus, collect data, and transmit the data to a database by the PLC in any existing environment, it is necessary to create a program that operates on the PLC.

With regard to the creation of the program, Patent literature 1 describes a source code template generation device which generates a source code template from an exemplary source code. In addition, Patent literature 2 describes a method of automatically generating a program for a PLC by combining a program code selected by a user.

LITERATURE OF RELATED ART

Patent Literature

Patent literature 1: Japanese Patent Publication "Japanese Patent Laid-Open No. 2009-230606 (published on Oct. 8, 2009)"
Patent literature 2: Japanese Patent Publication "Japanese Patent Laid-Open No. 2013-33479 (published on Feb. 14, 2013)"

SUMMARY

Problems to be Solved

However, when the data collection program executed by the PLC is generated using the techniques described in Patent literature 1 and Patent literature 2, it is necessary to set corresponding parameters for each FA apparatus. In addition, it is also necessary to set parameters for communication with the FA apparatus.

Therefore, there is a problem that a large burden is imposed on an operator who generates the program when generating the data collection program to be executed by the PLC using the above-described conventional techniques. In addition, a problem that the quality level of the generated program varies due to an ability difference between operators, and furthermore, a problem that the format of the output data differs personally are also present.

An aspect of the present invention is accomplished in view of the above problems, and an objective of the present invention is to realize a program development support device or the like that facilitates generation of a program for carrying out data collection performed by a PLC and reduces the burden on an operator.

Means to Solve Problems

The disclosure adopts the following configuration in order to solve the above-described problems.

That is, a program generation device according to an aspect of the present invention generates a data collection program enabling a programmable logic controller (PLC) to execute processing related to data collection, and includes: a storage portion which stores program templates corresponding to various processing related to the data collection and stores, for each target apparatus from which data is to be collected, apparatus parameters corresponding to the target apparatus; a reception portion which receives input of the target apparatus from a user; and a program generation portion which generates a data collection program for collecting data from the target apparatus by the PLC by using the program templates and the apparatus parameters corresponding to the target apparatus received by the reception portion.

According to the above configuration, a data collection program executed by the PLC can be generated by merely inputting the target apparatus. Therefore, the burden on the operator can be significantly reduced as compared with before, and a data collection program executed by the PLC can be generated with a constant quality level and a unified output format being secured.

In addition, a control method of a program generation device according to an aspect of the present invention is the control method of a program generation device which generates a data collection program enabling a programmable logic controller (PLC) to execute processing related to data collection. Program templates corresponding to various processing related to the data collection and, for each target apparatus from which data is to be collected, apparatus parameters corresponding to the target apparatus are stored in a storage portion. The control method includes: a reception step of receiving input of the target apparatus from a user; and a program generation step of generating a data collection program for collecting data from the target apparatus by the PLC by using the program templates and the apparatus parameters corresponding to the target apparatus received in the reception step.

The program generation device according to each aspect of the present invention may be realized by a computer. In this case, a control program of a program generation device which realizes the program generation device by a computer by operating the computer as each part (software element) included in the program generation device, and a recording medium which is computer-readable and on which the control program is recorded also fall into the category of the present invention.

Effect

According to an aspect of the disclosure, an automatic program generation method with a small burden on an operator can be provided.

BRIEF DESCRIPTION OF THE DRAWINGS

FIG. 6 is a diagram showing an example of a user interface screen when processing is started in the embodiment.

DESCRIPTION OF THE EMBODIMENTS

An embodiment according to an aspect of the disclosure (hereinafter, also referred to as "the embodiment") are described below with reference to drawings. However, the embodiment described below is merely an example of the disclosure in all points. Evidently, various improvements and modifications can be made without departing from the scope of the disclosure.

1 APPLICATION EXAMPLE

Figure 2:
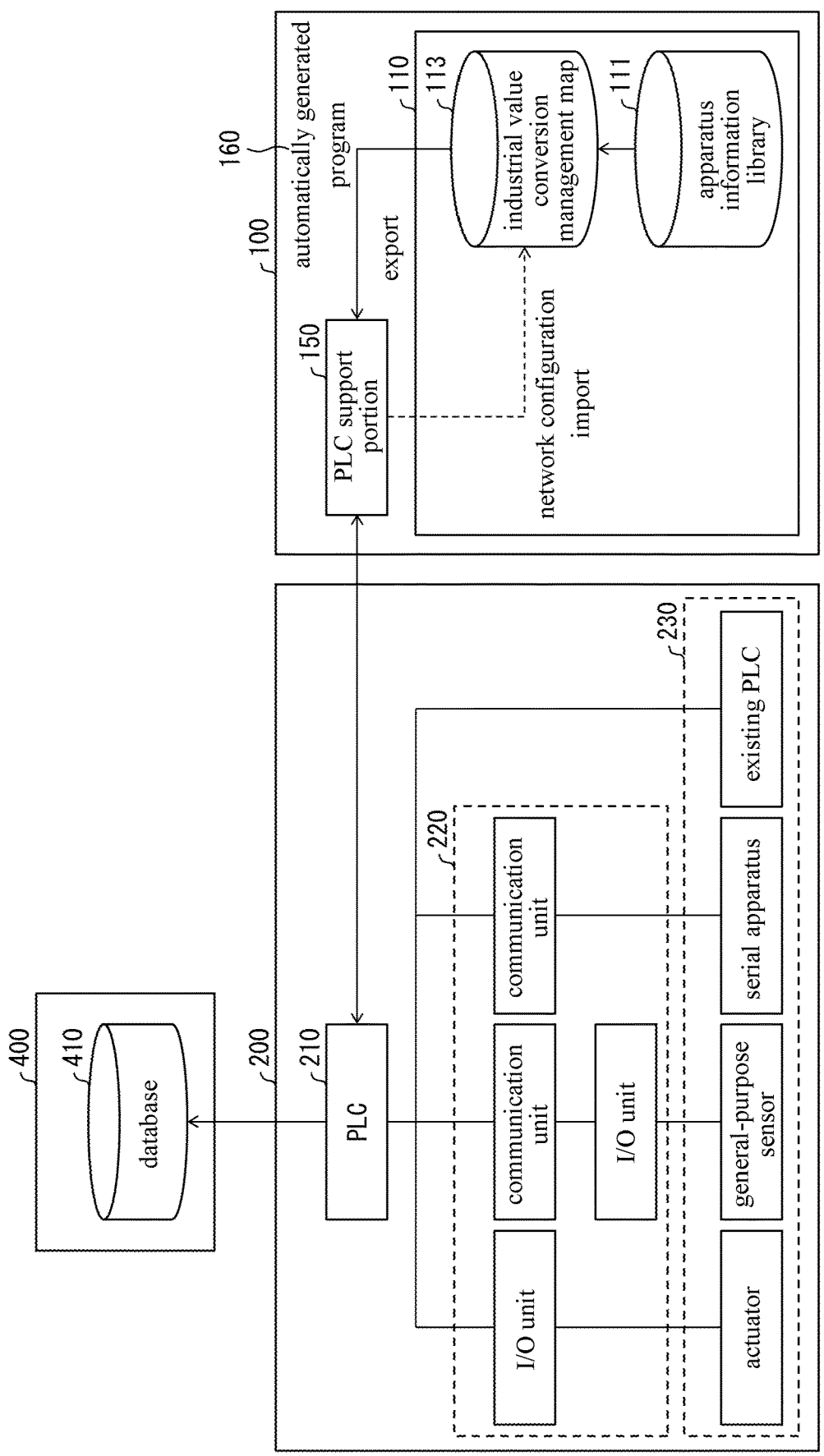
FIG. 2 is a diagram showing an overall outline of the embodiment.

First, an example of a scene in which the present invention is applied is described with reference to FIG. 2. FIG. 2 is a diagram showing an overall outline of the embodiment. FIG. 2 shows a scene in which an automatic program generation portion (a program generation device) 110 according to the embodiment is applied.

In the example shown in FIG. 2, a terminal device 100 which controls a PLC 210 included in a production system 200 is described. In the terminal device 100, the automatic program generation portion 110 which generates a program for controlling the PLC 210 is included.

As shown in FIG. 2, the automatic program generation portion 110 generates a data collection program for the PLC 210 to collect data from a target apparatus by using program templates and apparatus parameters which are stored in an apparatus information library (a storage portion) 111 and correspond to an apparatus specified by a user. Because the data collection program for the PLC 210 to collect the data from the target apparatus can be generated by merely specifying the target apparatus by the user, the data collection program can be automatically generated without imposing a burden on the user.

Besides, in the production system 200 according to the embodiment, the PLC 210 executes the data collection program generated by the automatic program generation portion 110 and thereby collects data output from a terminal apparatus 230 via a relay apparatus (a relay device) 220 of a general-purpose sensor, an existing PLC, and the like. Besides, the PLC 210 performs processing, for example, a linear conversion or the like, on the collected data, converts device variables into industrial quantity variables, and stores the obtained industrial quantity variables in a database 410. Moreover, the data collection program in the embodiment includes a PLC control program for acquiring the data from the target apparatus such as the relay apparatus 220 or the like by the PLC 210 and converting the acquired data, and a database definition program for storing the converted data in the database 410.

In the embodiment, a network configuration import portion 112 of the automatic program generation portion 110 imports network configuration information of the production system 200. By the importing, an already set configuration in the relay apparatus 220 (communication units and I/O units) can be acquired. Besides, for the terminal apparatus 230 (a sensor, an actuator, and the like) after the relay apparatus 220, a matching processing portion 115 presents the user with options which limit candidates, and makes the user select the options.

Thereby, the user can create a data collection program in accordance with the network configuration without the need for the trouble of investigating the configuration up to the relay apparatus 220 (the communication units and the I/O units). In addition, because it is sufficient to merely select the option for the terminal apparatus 230 (the sensor, the actuator, or the like), the data collection program can be created easily and quickly.

In addition, a communication program between the apparatuses can be generated based on the network configuration information, and the data of the terminal apparatus 230 which requires a communication processing program for the data acquisition can be acquired by the generated data collection program.

Furthermore, because elements which cannot be presented in the options can be added and corrected, a data collection program can be created according to an environment and individual differences between apparatuses.

In addition, because the apparatus information library 111 separately holds apparatus information parameters 1111 and program templates 1112, the data collection program can be created in the same method for apparatuses in different models without concerning the difference in the interface and the like between the apparatuses.

Moreover, in the program templates 1112, processing other than the industrial value conversion, such as communication processing and the like, can also be described. Thereby, the data collection program can be created in the same method even for an apparatus that requires program processing such as communication processing and the like before the industrial value conversion.

2 CONFIGURATION EXAMPLE

[Hardware Configuration]
<Production System>

Next, an example of a hardware configuration of the production system according to the embodiment is described with reference to FIG. 2.

In the example shown in FIG. 2, the production system 200 according to the embodiment includes the PLC 210, the relay apparatus 220, and the terminal apparatus 230. The relay apparatus 220 may be incorporated in the PLC 210. The terminal apparatus 230 includes a factory automation (FA) apparatus which directly acts on the work or the environment, and may be, for example, various general-purpose sensors, actuators, or serial apparatuses. In addition, an existing PLC may be included in the terminal apparatus 230 for convenience. The relay apparatus 220 includes an apparatus inserted between the PLC 210 and the terminal apparatus 230, and may be, for example, various I/O units and communication units. The connection method between the relay apparatus 220 and the terminal apparatus 230 may be configured to be operable by using a known technique.

<Automatic Program Generation Portion>

Next, the terminal device 100 according to the embodiment is described, which includes the automatic program generation portion 110 that automatically generates the program. As shown in FIG. 2, the terminal device 100 according to the embodiment includes the automatic program generation portion 110 and a PLC support portion 150. The terminal device 100 is, for example, a personal computer (PC). The terminal device 100 is connected to the PLC 210 by, for example, a USB cable. Communication such as the acquisition of the sensor data from the PLC 210, writing of a program to the PLC 210 is performed through the USB cable and the PLC support portion 150. In addition, instead of the USB, the terminal device 100 may be connected by Ethernet (registered trademark), and the communication may be performed through an Ethernet cable and a LAN apparatus.

The terminal device 100 includes a central processing unit (CPU), a random access memory (RAM), a read only memory (ROM), and the like.

<Database>

The PLC 210 is connected to the database 410 of a database storage device 400 through a LAN network, and records the data collected by the data collection program in the database 410. The database storage device 400 is, for example, a PC. The database 410 is not limited to being connected by a LAN network, and may exist on the cloud connected by the Internet for example. In addition, the database 410 may be a relational DB such as a SQL Server or the like, or may be a non-relational DB.

[Functional Configuration]

Figure 1:
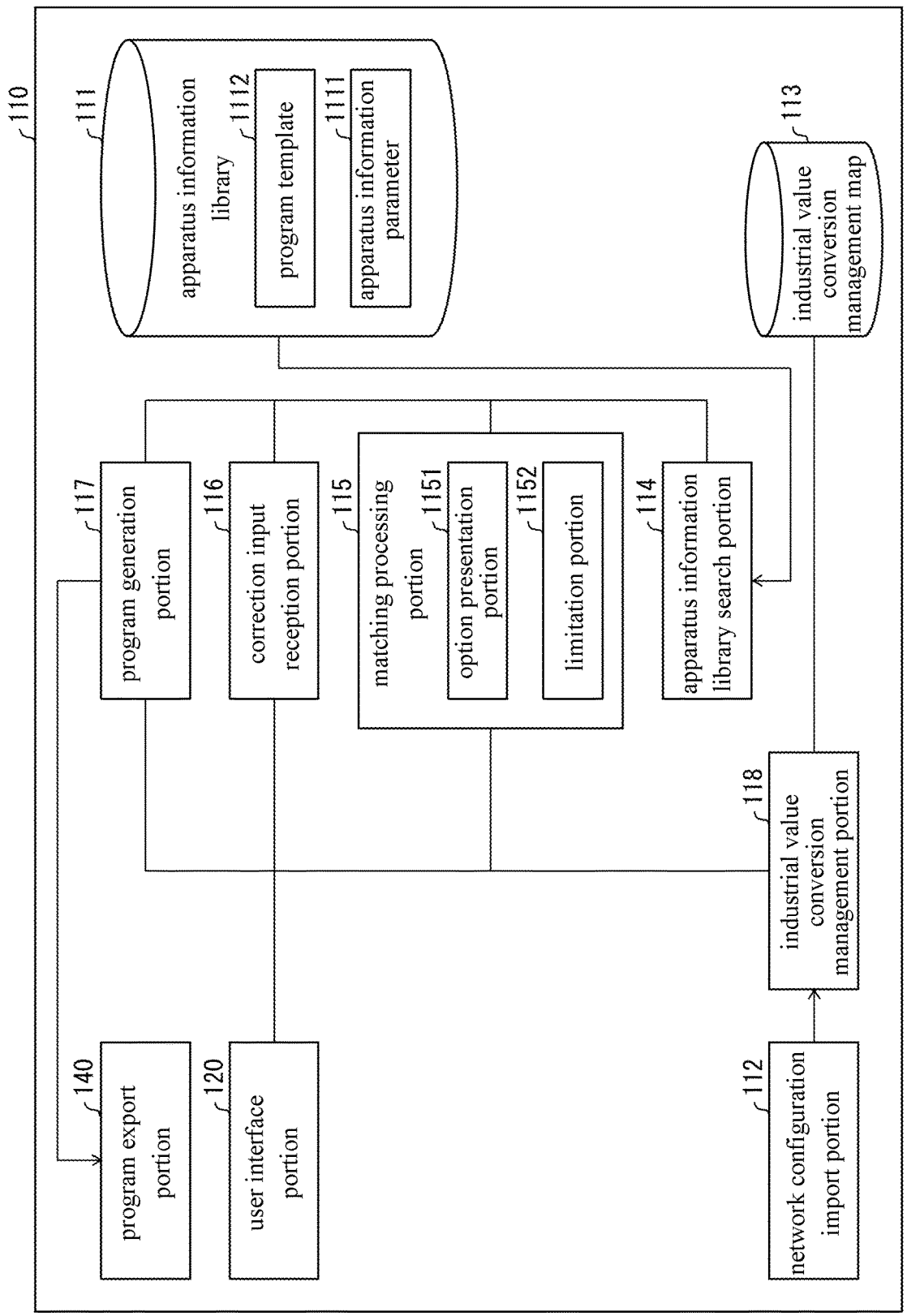
FIG. 1 is a functional block diagram showing a configuration of main parts of a program generation portion according to an embodiment.

Next, a functional configuration of the automatic program generation portion 110 of the terminal device 100 according to the embodiment is described with reference to FIG. 1. FIG. 1 is a functional block diagram showing a configuration of main parts of the automatic program generation portion 110.

<Terminal Device>

The terminal device 100 includes the automatic program generation portion 110 and the PLC support portion 150. The PLC support portion 150 mediates between the PLC 210 and the automatic program generation portion 110. For example, the PLC support portion 150 acquires existing network configuration information of the production system 200 from the PLC 210 and imports the existing network configuration information into the automatic program generation portion 110, writes the data collection program generated by the automatic program generation portion 110 to the PLC 210, and the like.

<Automatic Program Generation Portion>

In the example shown in FIG. 1, the automatic program generation portion 110 includes the apparatus information library 111, the network configuration import portion 112, an apparatus information library search portion 114, an industrial value conversion management map 113, the matching processing portion 115, a correction input reception portion 116, a program generation portion 117, a user interface portion (a reception portion) 120, and a program export portion 140.

The apparatus information library 111 includes the apparatus information parameters 1111 and the program templates 1112.

Figure 3:
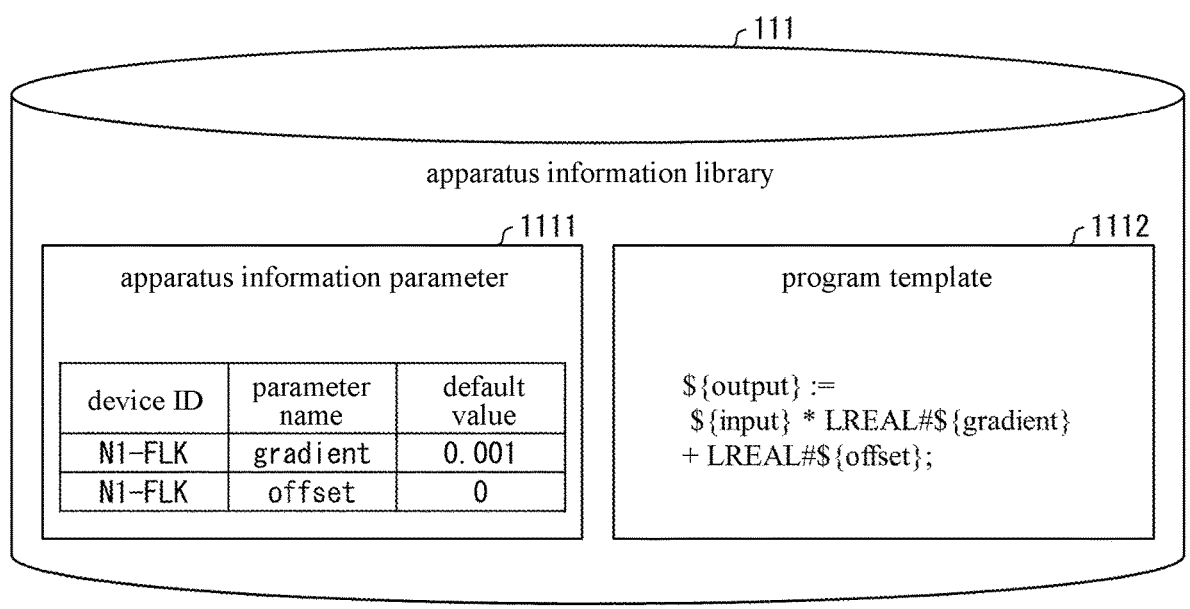
FIG. 3 is a diagram showing an apparatus information library according to the embodiment.

FIG. 3 is a diagram exemplifying the content of the apparatus information library 111. As described above, the apparatus information library 111 holds the apparatus information parameters 1111 and the program templates 1112. In the apparatus information parameter 1111, a device ID for identifying the target apparatus and a parameter name and a default value of the target apparatus are associated with each other. In addition, in the program templates 1112, the processing content to be executed by the PLC 210 is described in a state that a section corresponding to the target apparatus is a placeholder. More specifically, the program templates 1112 include a template of the data collection program for the PLC 210 to collect the data and convert the collected data into an industrial value, and a template of the database definition program for storing the obtained industrial value in the database 410. The data collection program includes programs required for the data collection, such as a program for reading the data transmitted from the target apparatus, a program for enabling the target apparatus to perform the data transmission, a program for controlling the communication between the PLC 210 and the target apparatus, and the like.

The network configuration import portion 112 acquires the network configuration information from the PLC 210, and transmits the network configuration information to the industrial value conversion management portion 118. The network configuration information is information showing the configuration of the apparatus connected to the PLC 210.

The industrial value conversion management map 113 stores the network configuration information and information required for generating the program in the automatic program generation portion 110. The information required for generating the program includes a model, setting information, a manufacturer name, an industrial value unit, a conversion coefficient, a device variable name, an industrial quantity variable name, and the like of each apparatus.

The industrial value conversion management portion 118 manages input/output to/from the industrial value conversion management map 113.

The apparatus information library search portion 114 reads the apparatus information parameter 1111 and the program templates 1112 from the apparatus information library 111.

The matching processing portion 115 matches the network configuration information with the apparatus information parameter 1111 and narrows down the candidates of the assumed apparatus model. The matching processing portion 115 includes an option presentation portion 1151 and a limitation portion 1152.

The option presentation portion 1151 presents the narrowed-down result to the user as the option. The limitation portion 1152 narrows down only the apparatuses for which the apparatus type and the manufacturer are specified among the apparatuses that can be connected as the terminal apparatus, and presents the result to the user. The user selects an apparatus which is decided to be the most suitable among the presented options.

The correction input reception portion 116 receives the input for arbitrarily editing a value in the industrial value conversion management map by the user. For example, the editing of upper and lower limit values of the input/output is received.

The program generation portion 117 generates the data collection program based on the apparatus selected by the user, the information input to the industrial value conversion management map 113, and the program templates 1112. Moreover, for example, the user may click a program generation button (not shown) on a user interface screen, and when receiving the click, the user interface portion 120 enables the program generation portion 117 to start generating the program.

The generated data collection program is exported via the program export portion 140 and written to the PLC 210 by the PLC support portion 150. Moreover, the generated data collection program may not be used directly, and the data collection program may be tuned (corrected) as necessary.

The user interface portion 120 controls an apparatus that receives the presentation to the user and the input from the user. The apparatus controlled by the user interface portion 120 includes, for example, a display, a touch panel, a speaker, a keyboard, a mouse, a microphone, and the like.

3 OPERATION EXAMPLE

Figure 4:
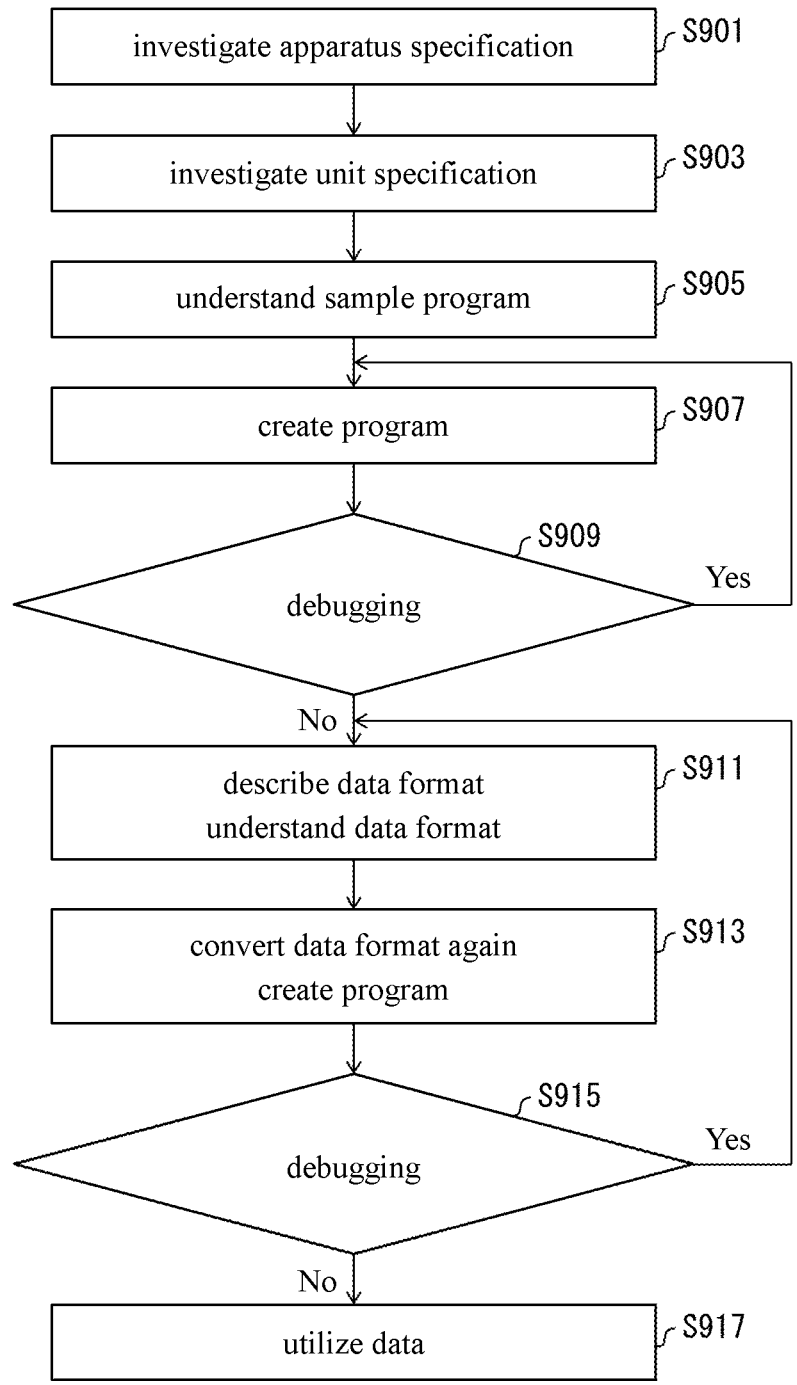
FIG. 4 is a flowchart showing conventional work steps.

First, a conventional processing flow is briefly described with reference to FIG. 4. Conventionally, when the data collection program corresponding to the embodiment is generated, a technician in charge of the site repeats the processing of investigating the specification of the target apparatus (S901), investigating the unit specification (S903), understanding and examining a sample program for collecting the data from the target apparatus (S905), creating a data collection program (S907), and making a correction if there is debugging (S909).

Then, when there is no debugging, the processing is repeated in which the format of the data collected from the target apparatus is described for an IT technician (S911), a data conversion program corresponding to the data format is created by the IT technician (S913), and a correction is made if there is debugging (S915). Then, if there is no debugging, the processing proceeds to a flow in which the created data collection program is used (S917).

Therefore, conventionally, there are many work processes, and the communication between the site technician and the IT technician becomes necessary, which becomes a heavy burden on the operator. Furthermore, the data collection program created by this processing can only be used when the data is collected from the target apparatus.

Figure 5:
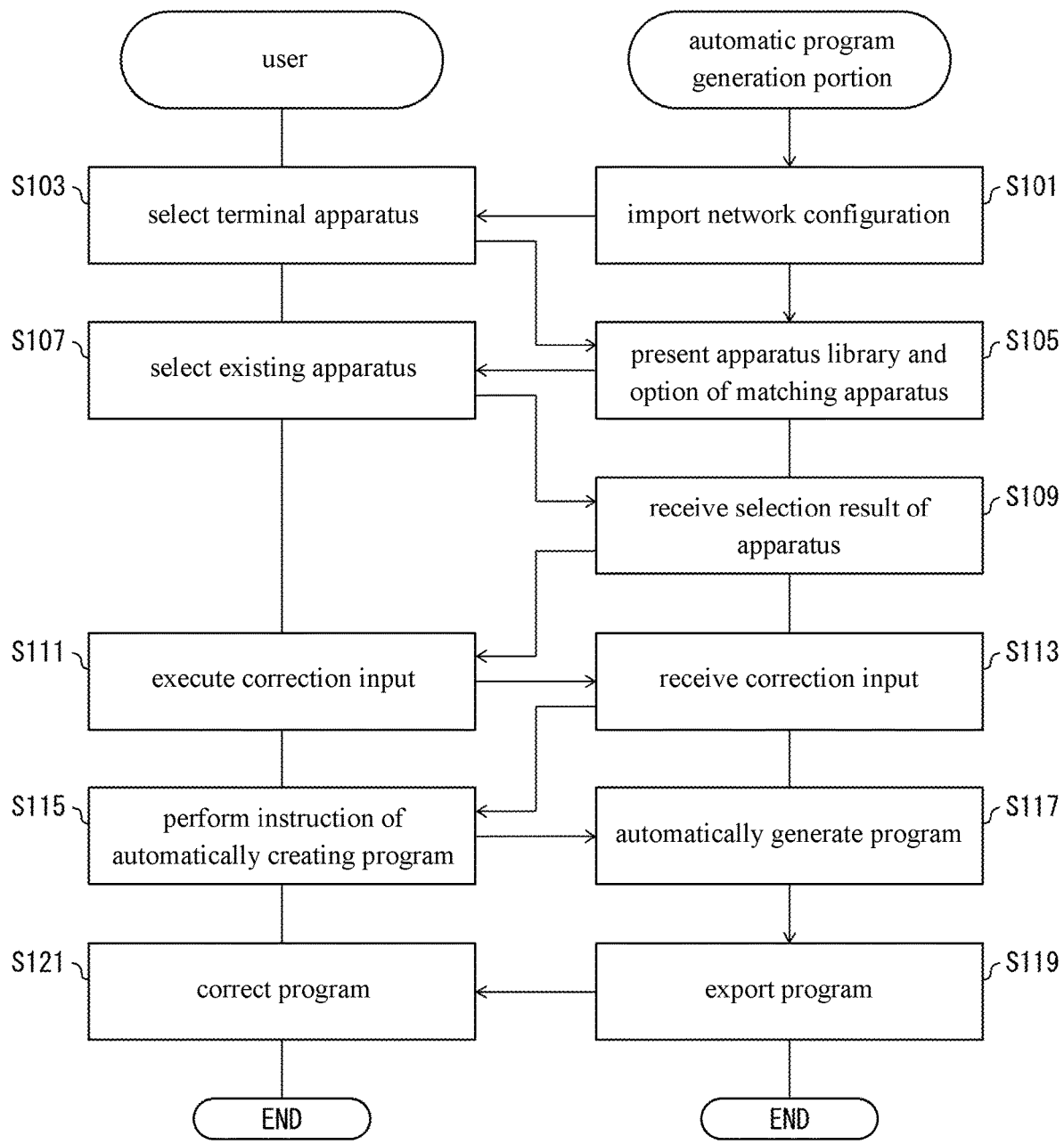
FIG. 5 is a flowchart showing a processing flow in the embodiment.

Next, an operation example of the automatic program generation portion 110 is described with reference to FIG. 5. FIG. 5 is a flowchart showing an example of processing of the automatic program generation portion 110. Moreover, the processing described below is merely an example, and each processing may be changed as much as possible. In addition, with regard to the processing described below, steps can be appropriately omitted, replaced, and added according to the embodiment.

First, the user connects the production system 200 (including the PLC 210) and the terminal device 100. Next, the terminal device 100 is started up, and the PLC support portion 150 of the started up terminal device 100 imports the network configuration information of the production system 200 into the automatic program generation portion 110. Then, the automatic program generation portion 110 starts the processing.

FIG. 6 shows an example of the user interface screen when the processing of the automatic program generation portion 110 is started. As shown in FIG. 6, on the user interface screen at the start of the processing, the industrial value conversion management map 113 is displayed on the left side. The right side is a region used when the user selects the apparatus or inputs a numerical value or a character string related to the apparatus parameter, and the right side includes buttons for selecting the apparatus type and the manufacturer. At the start of the processing, the content of the industrial value conversion management map 113 is initialized, and as shown in FIG. 6, no information is input to the user interface screen. Moreover, the content and the like of the industrial value conversion management map 113 at the time of the previous end may be automatically read by a script or the like executed at software setting or startup.
(Step S101)

In S101, the user uses a network configuration import menu (not shown) to import the current network configuration information. The user interface portion 120 of the automatic program generation portion 110 receives this operation. Thereby, the network configuration import portion 112 captures the network configuration information of the production system 200 at that time and inputs the network configuration information to the industrial value conversion management map 113. Moreover, the already specified network configuration information may be automatically captured by a script and the like executed at software setting or startup.

Figure 7:
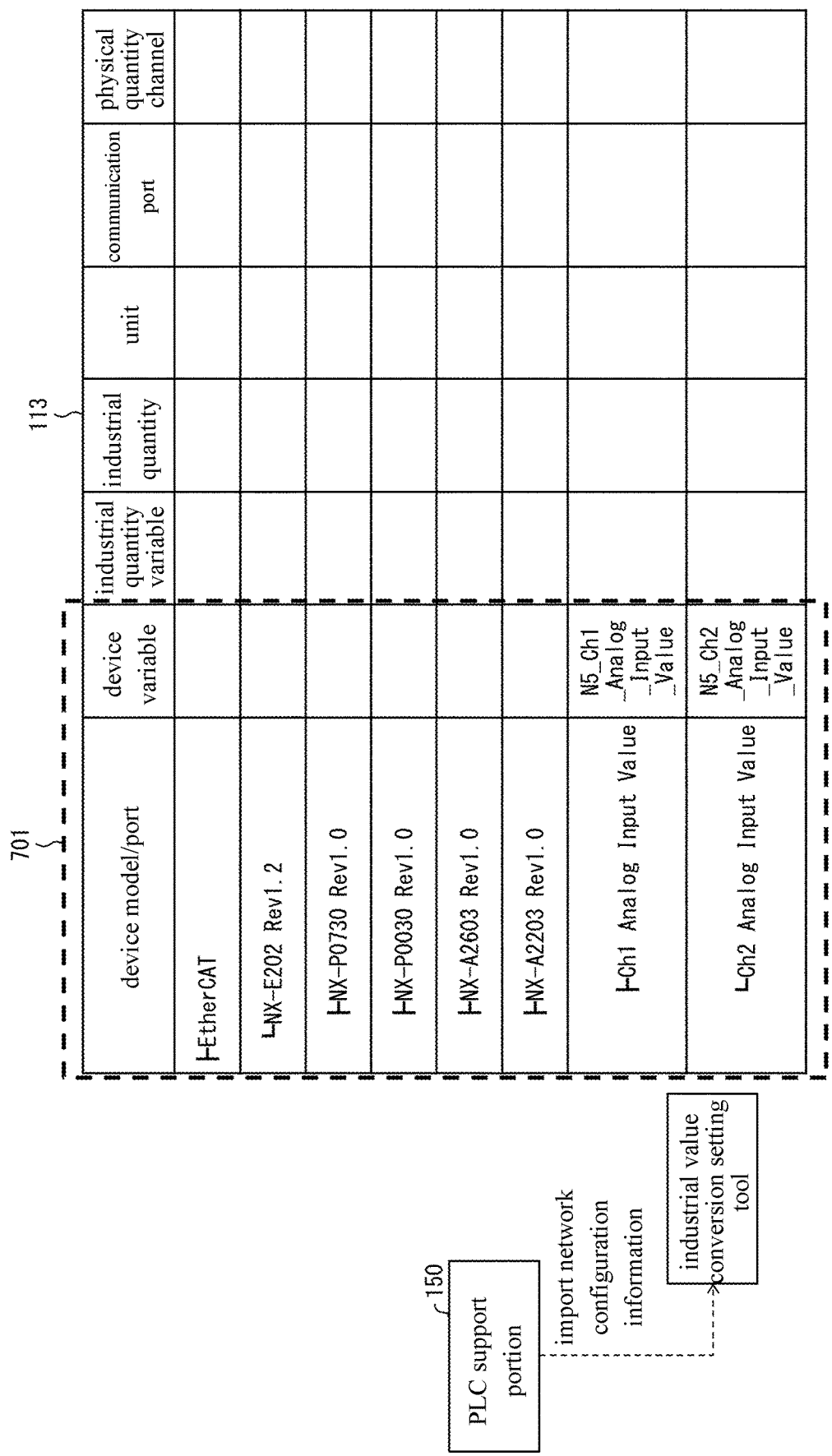
FIG. 7 is a diagram showing an example in which network configuration information is captured on the interface screen.

FIG. 7 is an image diagram showing the capture result. The captured values are input and displayed in a column region of the apparatus model and a column region of the device variable which are shown in a region 701 surrounded by broken lines.
(Step S103)

Figure 8:
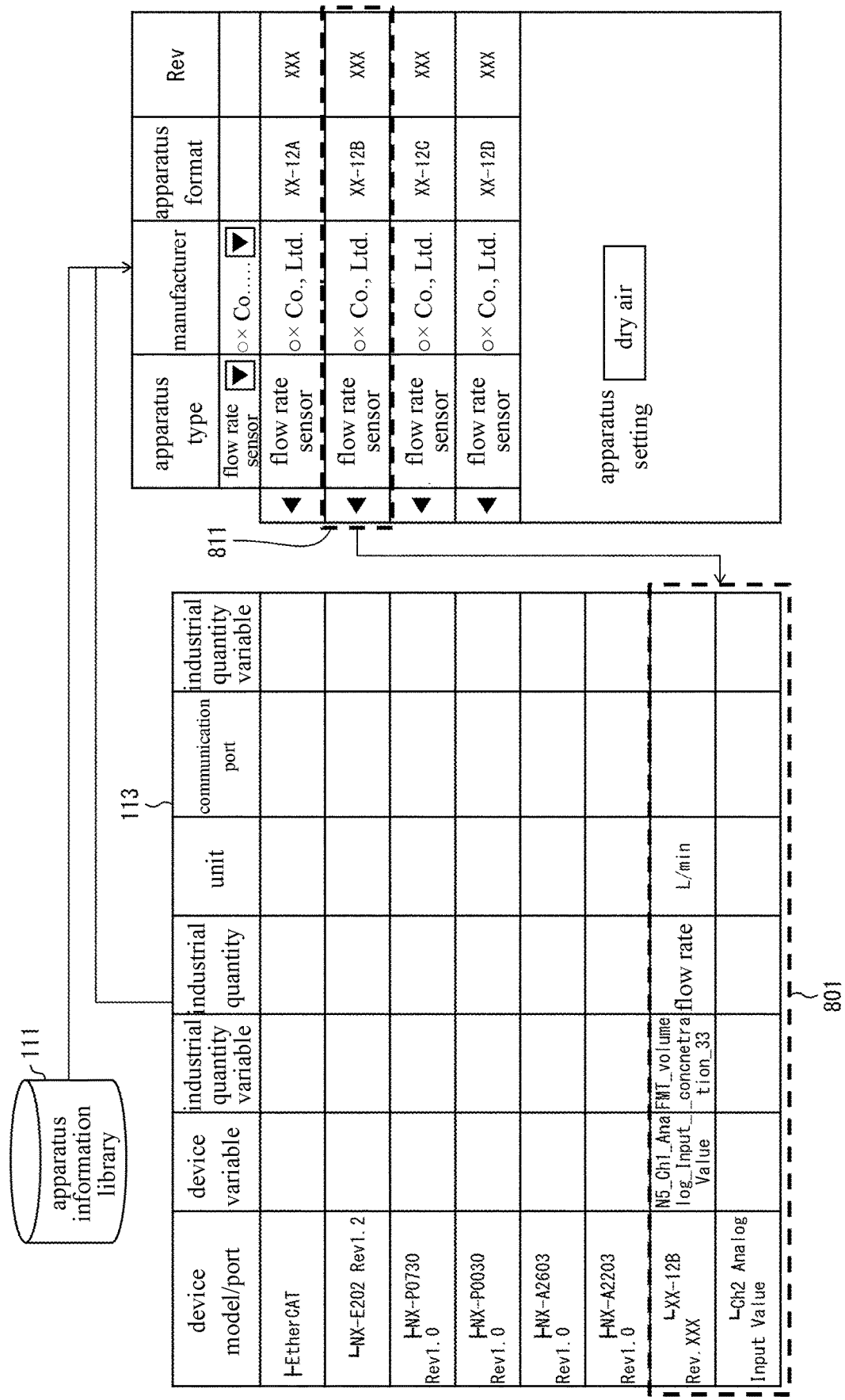
FIG. 8 is a diagram showing an example of a result of matching processing and a writing result to an industrial value conversion management map on the interface screen.

S103 is described with reference to FIG. 8. Following S101, the user selects the terminal apparatus 230 by clicking a region 801, which is shown by broken lines and shows the terminal apparatus, in the region displaying the industrial value conversion management map 113 on the left side of the user interface screen. Then, the matching processing portion 115 matches the model of the relay apparatus 220 located between the selected terminal apparatus 230 and the PLC 210 with the apparatus information parameter 1111, and narrows down the candidates that can be connected as the terminal apparatus 230.
(Step S105)

In S105, the option presentation portion 1151 presents candidate apparatuses on the right side of the user interface screen based on the narrowed down result. Next, the user clicks a pull-down menu (an input region) for selecting the apparatus type in the region on the right side, and selects "flow rate sensor" for example. Thereby, the matching processing portion 115 displays flow rate sensors among the apparatuses that can be connected as the terminal apparatus 230. Next, the user clicks a pull-down menu for selecting the manufacturer, and selects, for example, "○× Co., Ltd.". Thereby, the limitation portion 1152 narrows down and displays only the apparatus whose apparatus type and manufacturer are the specified among the apparatuses that can be connected as the terminal apparatus 230.

(Step S107)

In S107, the user selects a line 811 (shown by hatching), in which the apparatus actually used at the production site is displayed, from the candidates narrowed down in Step S105, and clicks an arrow button at the left end, thereby selecting the existing terminal apparatus 230.

(Step S109)

In S109, the matching processing portion 115 inputs a specific apparatus model (the format and the revision) to the industrial value conversion management map 113 based on the terminal apparatus 230 shown by the selected line. In addition, the physical quantity, the value of the apparatus setting, and the like are input to the industrial value conversion management map 113 based on the apparatus information parameter 1111 corresponding to the apparatus model.

(Step S111)

Figure 9:
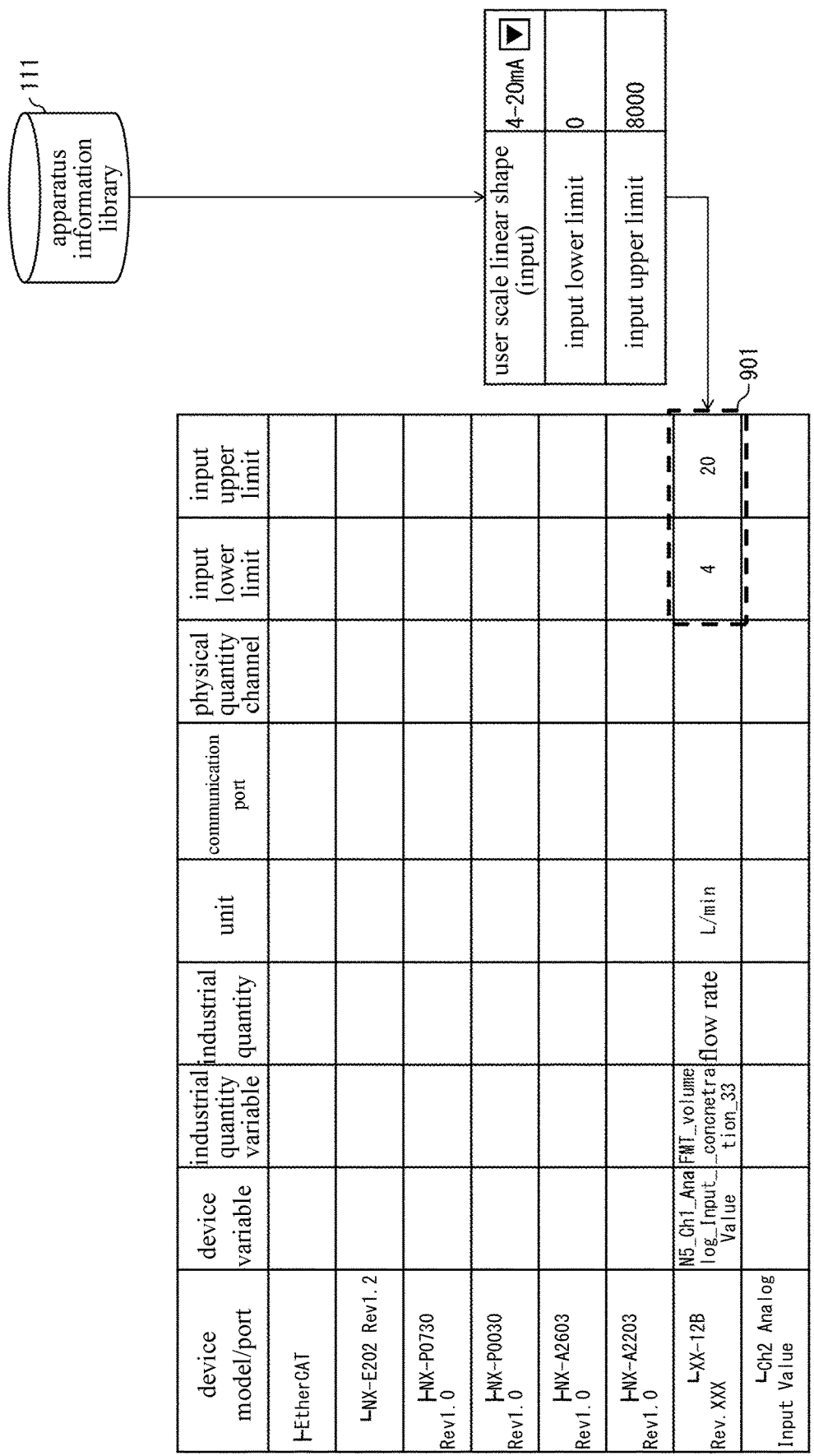
FIG. 9 is a diagram showing an example of a case that a user performs correction input on the interface screen.

A processing flow of a case that the user performs correction input is shown with reference to FIG. 9. In S111, the user confirms the industrial value conversion management map 113 obtained in Step S109, and performs the correction input as necessary in accordance with the environment of the site and the individual difference between apparatuses. In addition, in S111, the upper limit value and the lower limit value of the input/output can be edited. As a result of editing by the user, the industrial value conversion management map 113 is updated, and the value after update is displayed as in a region 901 surrounded by broken lines.

That is, the correction input reception portion 116 receives a correction instruction for the data collection program generated by the program generation portion 117, and the program generation portion 117 reflects the correction content received by the correction input reception portion 116 in the generated data collection program.

(Step S113)

In S113, the correction input reception portion 116 receives the correction input value input by the user, and inputs the correction input value to the industrial value conversion management map 113.

(Step S115)

In S115, the user performs an instruction of automatically creating a program by using a menu (not shown) on the user interface screen. Moreover, the program generation may be automatically started omitting S115 after the apparatus is selected in S107 or after the correction input is performed in S111.

(Step S117)

In S117, the program generation portion 117 generates the data collection program based on the value input to the industrial value conversion management map 113 and the program templates included in the apparatus information library 111. The automatic generation of the program is described with reference to FIG. 10.

Figure 10:
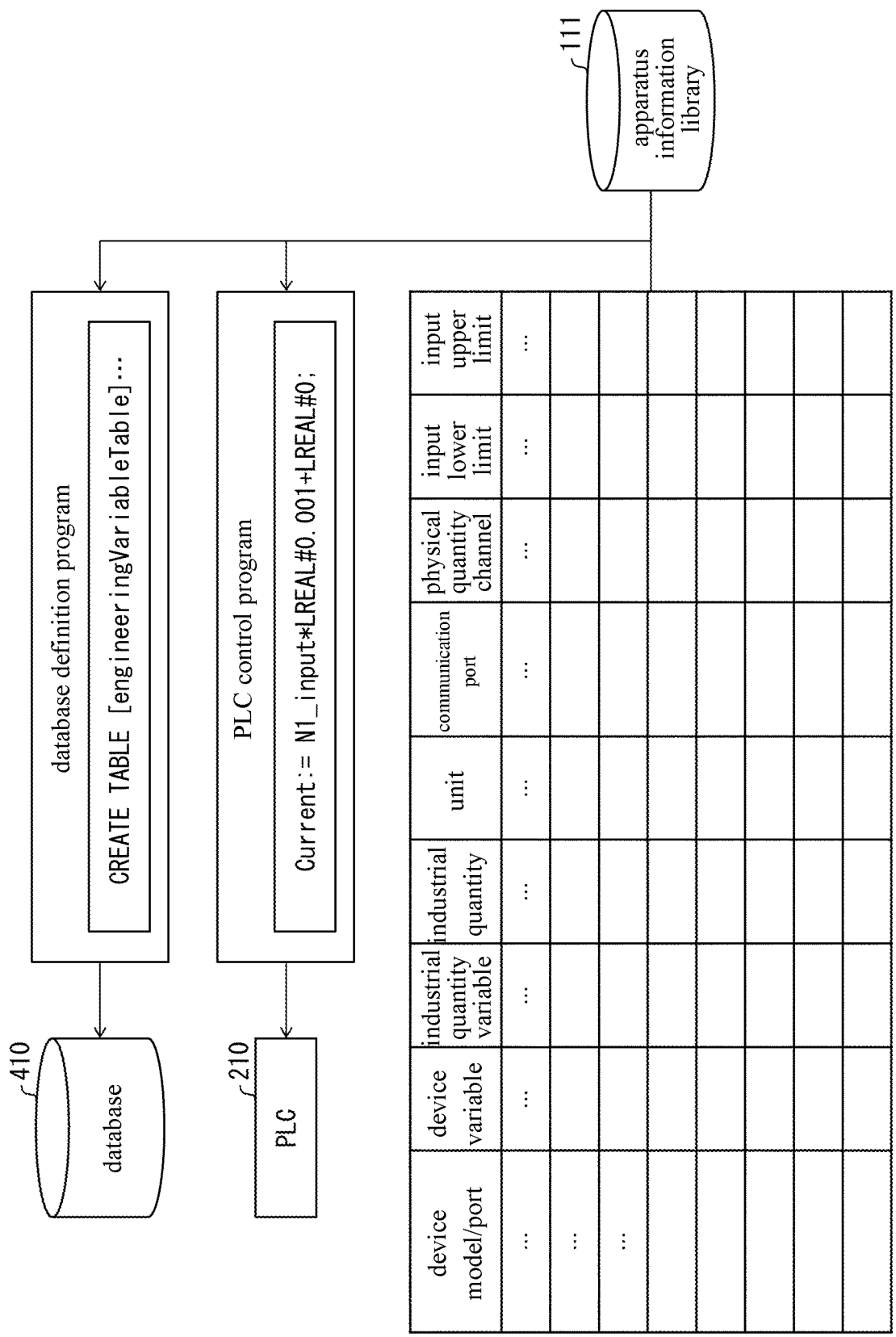
FIG. 10 is a diagram for describing an example of creating a PLC control program and a database definition program from the industrial value conversion management map.

FIG. 10 is a diagram for describing the automatic generation of the data collection program. As shown in FIG. 10, the program generation portion 117 uses the device variable, the industrial quantity variable, the upper limit value and the lower limit value of the input/output, and the like, which are input to the industrial value conversion management map 113, to replace the placeholders in the program template and create the PLC control program. In the data collection program example "current: =N1_input*LREAL #0.001+ LREAL #0;" shown in FIG. 10, "( ):=( )*LREAL #( )+LREAL #( );" corresponds to the program template, and the parts "current", "N1_input", "0.001", and "0" are placeholders.

Figure 11A:
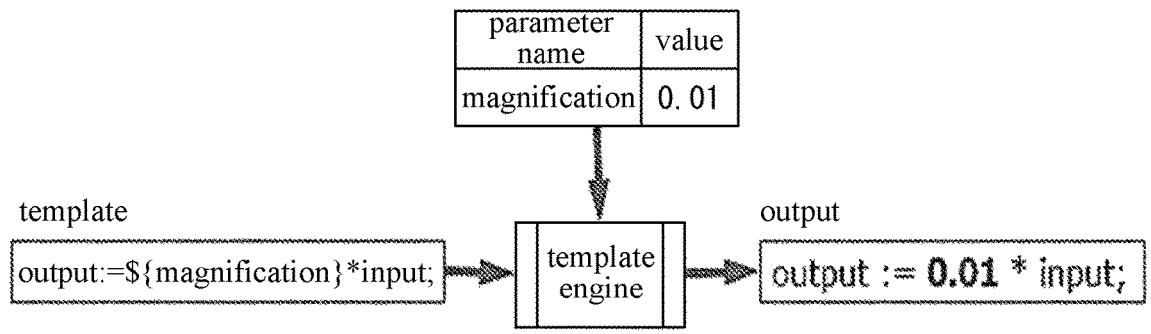
FIG. 11(a) to FIG. 11(c) are diagrams showing an example of program generation processing.
Figure 11B:
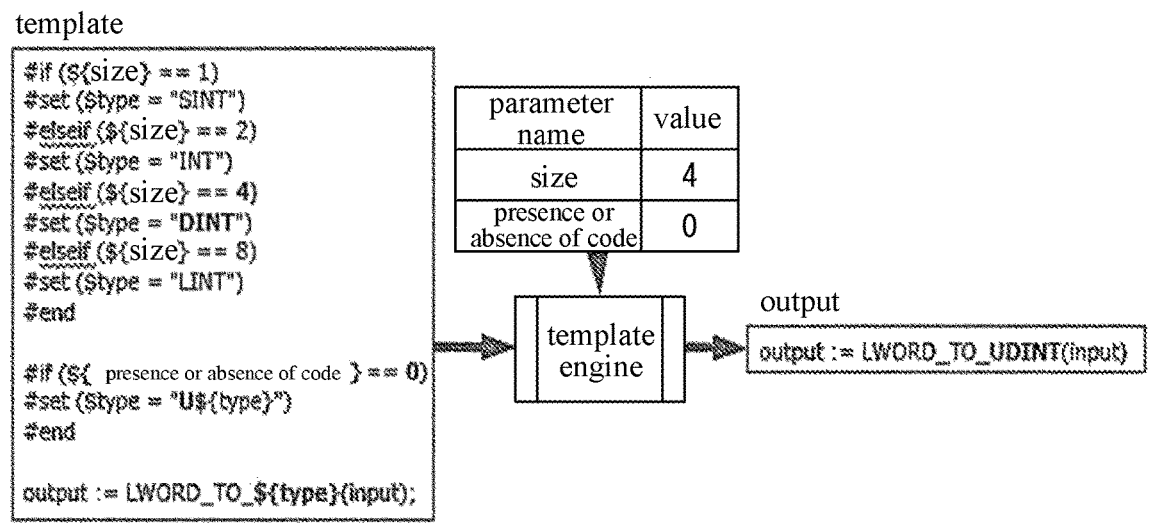
Figure 11C:
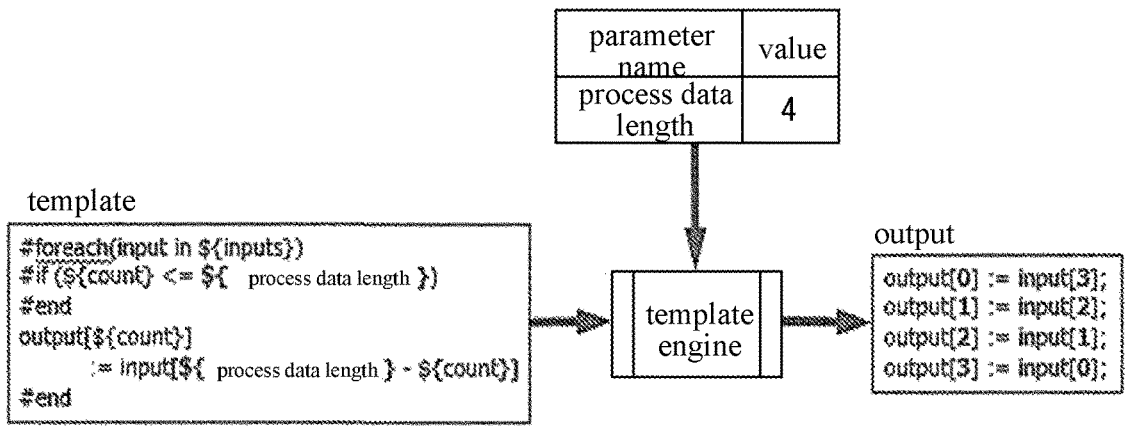

That is, an incorporation column (the placeholder) which incorporates the apparatus information parameter 1111 is arranged in the program templates 1112, and the program generation portion 117 generates the data collection program by incorporating the apparatus information parameter 1111 into the incorporation column of the program templates 1112. In addition, in the generation of the program, not only the placeholder is simply replaced, but branching and repetition processing (processing corresponding to the apparatus information parameter 1111) may also be performed according to the parameter. FIG. 11(a) to FIG. 11(c) show an example of the program generation processing. FIG. 11(a) is an example of generating the data collection program by incorporating the apparatus information parameter 1111 into the incorporation column of the program templates 1112, and the data collection program is generated by moving the decimal point of the data acquired by an integer to convert the data to a real number. In addition, FIG. 11(b) is an example of branching according to the apparatus information parameter 1111 (changing the processing of outputting according to the parameter value), and the data collection program is generated by cast processing corresponding to the size (data length) and the presence or absence of a code. In addition, FIG. 11(c) is an example of repetition (outputting the repetition processing for a number of times specified by the parameter), and an endian conversion corresponding to the process data length is performed to generate the data collection program.

In addition, the program generation portion 117 creates the database definition program based on the industrial quantity variable and the physical quantity. That is, the program generation portion 117 generates the database definition program for defining the database, which stores the collected data, by using the program templates 1112 and the apparatus information parameter 1111 corresponding to the terminal apparatus 230.

(Step S119)

In S119, the program generation portion 117 exports the automatically generated program to the PLC 210 via the program export portion 140. The automatically generated program is described using a programming language, for example, a ST language or the like, for PLC control.

(Step S121)

In S121, the user may edit the automatically generated program and correct the program in accordance with the situation of the site. According to the site environment and the individual difference between apparatuses, the parameter can be corrected, and the database definition program and the communication control program may be edited.

Figure 12:
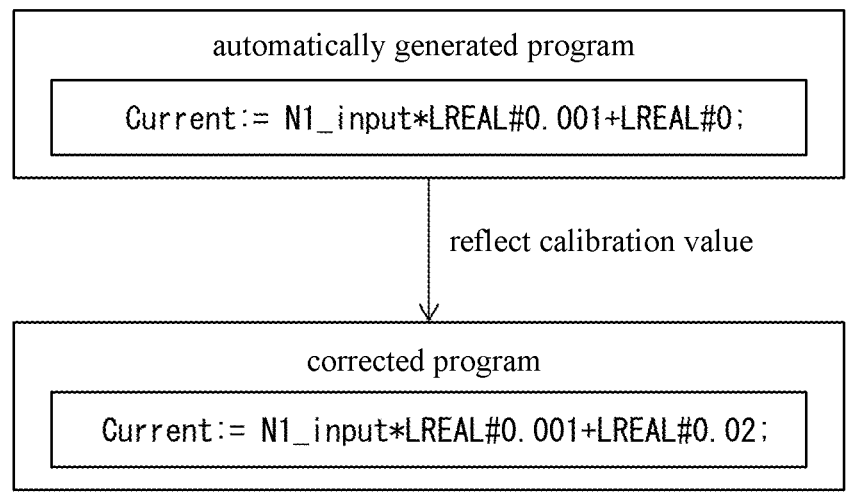
FIG. 12 is a diagram showing an example which reflects a calibration value.

FIG. 12 is a diagram showing an example of a case that a value is configured for the automatically generated program. For example, when the operator decides that it is appropriate to add a constant value of 0.02 at the time of the linear conversion according to the situation of the site, a formula which assigns a value to the variable Current can be edited in a manner that 0.02 can be added in a rightmost term of the formula.

As described above, in the embodiment, the data collection program can be easily generated, and thus the burden on the operator can be reduced.

Action/Effect

As described above, the automatic program generation portion 110 according to the embodiment generates the data collection program that enables the PLC 210 to execute the processing related to data collection and has a configuration including: the apparatus information library 111 which stores the program templates 1112 corresponding to various processing related to data collection and, for each terminal apparatus 230 from which the data is to be collected, the apparatus information parameters 1111 corresponding to the terminal apparatus 230; the user interface portion 120 which receives the input of the terminal apparatus 230 from the user; and the program generation portion 117 which generates the data collection program for collecting the data from the terminal apparatus 230 by the PLC 210 by using the program templates 1112 and the apparatus information parameters 1111 corresponding to the terminal apparatus 230 received by the user interface portion 120.

In this way, in the embodiment, the program template 1112 and the apparatus information parameter 1111 required for the generation of the data collection program are separately stored in the apparatus information library 111. By separating the apparatus information parameter 1111, the apparatus information parameter 1111 can be set for each terminal apparatus 230 in consideration of the differences such as whether the terminal apparatus 230 is an analog apparatus or a digital apparatus. Thereby, the user can cause the data collection program suitable for the terminal apparatus 230 to be generated by merely selecting the terminal apparatus 230.

In addition, because the data collection program is a control program in which the communication control with the terminal apparatus 230 is also included, it is not necessary to separately perform the setting related to the communication with the terminal apparatus 230.

In addition, the automatic program generation portion 110 acquires from the PLC 210 the information (the network configuration information) of the relay apparatus 220 connected to the PLC 210, and displays on the display portion the apparatuses that can be connected to the relay apparatus 220 as the selection candidates of the terminal apparatus 230.

Thereby, the terminal apparatuses 230 which are selection candidates are displayed in a limited manner. The user only need to select the terminal apparatus 230 as the target apparatus from the limited display, and can easily select the target apparatus.

Furthermore, the automatic program generation portion 110 displays a numerical value input screen which receives the input of the numerical value related to the apparatus information parameter 1111 corresponding to the terminal apparatus 230 selected from the selection candidates.

Thereby, the user can input the numerical value related to the apparatus information parameter 1111, and thus detailed setting can be made in accordance with the situation of the terminal apparatus 230, the situation of the site, and the like.

4 VARIATION EXAMPLE

Although the embodiment of the disclosure is described above in detail, the above description is merely an example of the disclosure in all points. Evidently, various improvements and modifications can be made without departing from the scope of the disclosure. For example, the following changes can be made. Moreover, in the following, the same reference numerals are used for the same components as those in the above embodiment, and the same points as in the above embodiment are not described as appropriate. The following variation examples can be appropriately combined.

<4.1>

For example, as shown in FIG. 2, the apparatus information library 111 is configured to exist inside the terminal device 100 in a way the same as the automatic program generation portion 110. However, the configuration of the terminal including the apparatus information library is not limited to this example, and may be appropriately selected according to an embodiment. For example, a configuration may be adopted in which the apparatus information library 111 exists in a device outside the terminal device 100 and is connected via a network such as LAN, the Internet, or the like, and the apparatus information library search portion 114 is connected to the apparatus information library 111 via a network.

Alternatively, the apparatus information library 111 may be divided into a server database outside the terminal device 100 and a local database inside the terminal device 100, and the local database inside the terminal device 100 may be appropriately created and updated. The information held by the local database may be a part or all of the server database. An update timing of the apparatus information library 111, a priority degree of the database used by the automatic program generation portion 110, a relationship between the server database and the local database, and the like may be appropriately changed according to an embodiment.

<4.2>

In addition, each element in the automatic program generation portion 110 shown in FIG. 1 other than the apparatus information library 111 is also configured to be executed on the same terminal. In other words, each element of the automatic program generation portion is configured to be executed on a terminal operated by the user, but a part of the elements may be executed by another device. For example, the program generation portion 117 may be executed by another device, for example, a device on the cloud, via a network such as LAN, the Internet, or the like. In this case, the automatic program generation portion 110 transmits the information required for program generation, such as information included in the industrial value conversion management map 113, and generates the program.

In addition, for example, the element related to the user interface and other elements may be divided into a front end portion and a back end portion, and the back end portion may be executed on another device via a network. In this case, the front end portion includes the function of the user interface portion 120, and the back end portion executes the operation according to an input instruction from the front end portion.

<4.3>

In addition, in the above embodiment, as shown in FIG. 2, the database 410 is configured to be stored in a device different from the terminal device 100. In other words, the database storage device 400 is connected to the production system 200, and the terminal device 100 is connected to the PLC 210 of the production system 200. However, the database 410 may be arranged in a device capable of transmitting the control program of the PLC 210 and the database definition program for performing the storage into the database 410, and the database 410 may be arranged, for example, inside the terminal device 100.

In addition, as shown in the variation examples <4.1> and <4.2>, the terminal device 100 may be configured to include only the front end portion, or the terminal device 100 may be configured, for example, to be connected via the network to which the production system 200 and the database storage device 400 are connected. In this case, the back end portion, the apparatus information library 111, and the database 410 are stored in the database storage device 400, and the back end portion is executed on the database storage device 400.

<4.4>

In addition, in the above embodiment, as shown in FIG. 2, the automatic program generation portion 110 is implemented as an application different from the PLC support portion 150, but the function of the automatic program generation portion 110 may be executed as a part of the function of the PLC support portion 150.

Implementation Example by Software

The automatic program generation portion (particularly the apparatus information library search portion 114, the matching processing portion 115, the program generation portion 117, and the industrial value conversion management portion 118) of the terminal device 100 may be realized by a logic circuit (hardware) formed in an integration circuit (an IC chip) or the like, or may be realized by software.

In the latter case, the terminal device 100 includes a computer that executes a command of a program which is software that realizes each function. The computer includes, for example, one or more processors and a computer-readable recording medium in which the program is stored. Besides, in the computer, the processor reads the program from the recording medium and executes the program, and thereby the objective of the disclosure is achieved. As the processor, for example, a central processing unit (CPU) can be used. As the recording medium, a "non-temporary tangible medium", for example, a read only memory (ROM), a tape, a disk, a card, a semiconductor memory, a programmable logic circuit, or the like can be used. In addition, a random access memory (RAM) or the like which expands the program may be further included. In addition, the program may be supplied to the computer via an arbitrary transmission medium (a communication network, a broadcast wave, or the like) capable of transmitting the program. Moreover, an aspect of the disclosure can also be realized in a form of a data signal which is embedded in a carrier wave and in which the program is embodied by electronic transmission.

Supplementary Note

A program generation device according to an aspect of the present invention generates a data collection program enabling a programmable logic controller (PLC) to execute processing related to data collection, and includes: a storage portion which stores program templates corresponding to various processing related to the data collection and, for each target apparatus from which data is to be collected, apparatus parameters corresponding to the target apparatus; a reception portion which receives input of the target apparatus from a user; and a program generation portion which generates a data collection program for collecting data from the target apparatus by the PLC by using the program templates and the apparatus parameters corresponding to the target apparatus received by the reception portion.

According to the above configuration, a data collection program executed by the PLC can be generated by merely inputting the target apparatus. Therefore, the burden on the operator can be significantly reduced as compared with before, and a data collection program executed by the PLC can be generated with a constant quality level and a unified output format being secured.

In the program generation device according to an aspect, an incorporation column which incorporates the apparatus parameter or processing corresponding to the apparatus parameter may be arranged in the program template, and the program generation portion may generate the data collection program by incorporating the apparatus parameter or processing corresponding to the apparatus parameter into the incorporation column of the program template.

According to the above configuration, the data collection program can be generated by merely incorporating the apparatus parameter or the processing corresponding to the apparatus parameter into the program template, and thus the data collection program can be easily generated.

In the program generation device according to an aspect, the program generation portion may generate the data collection program including a program for controlling communication for acquiring data from the target apparatus.

According to the above configuration, the program for controlling the communication with the target apparatus is included, and thus the data can be appropriately acquired even from a target apparatus in which the protocol for outputting the data is not set.

In the program generation device according to an aspect, information of a relay device connected to the PLC may be acquired from the PLC, and apparatuses which can be connected to the relay device may be displayed on a display portion as selection candidates of the target apparatus.

According to the above configuration, the apparatuses that can be connected to the relay device connected to the PLC are selected as the selection candidates of the target apparatus. Thereby, only the apparatuses that can be the target apparatus are displayed as candidates and can be selected by the user, and thus the user can easily input the target apparatus.

In the program generation device according to an aspect, a numerical input screen may be displayed which receives input of at least one of a numerical value and a character string related to the apparatus parameter corresponding to the target apparatus selected from the selection candidates.

According to the above configuration, the input of at least one of the numerical value and the character string related to the apparatus parameter is received. Thereby, the data collection program can be generated by using the apparatus parameter set in detail according to the situation of the target apparatus, the situation of the site, and the like. Moreover, the numerical value and the character string may be input by directly inputting the numerical value and the character string, or may be input by a slider or an up/down button.

In the program generation device according to an aspect, the program generation portion may generate a database definition program for defining a database which stores collected data by using the program templates and the apparatus parameters corresponding to the target apparatus received by the reception portion.

According to the above configuration, the database definition program can be generated by merely inputting the processing content and the target apparatus. Therefore, the database definition program can be generated with the burden on the operator significantly reduced as compared with before.

In the program generation device according to an aspect, the reception portion may accept a correction instruction for the data collection program generated by the program generation portion.

According to the above configuration, the program generated by the program generation portion can be corrected. Therefore, the program which more finely corresponds to the situation, the apparatus, the processing content and the like can be generated.

The disclosure is not limited to each of the above-described embodiments, and various changes can be made within the scope shown in claims, and embodiments obtained by appropriately combining the technical mechanisms respectively disclosed in different embodiments are also included in the technical scope of the disclosure.

What is claimed is:

1. A program generation device, which generates a data collection program enabling a programmable logic controller (PLC) to execute processing related to data collection, the program generation device comprising:
   a storage device which stores program templates corresponding to plural processing related to the data collection and stores, for each target apparatus from which data is to be collected, apparatus parameters corresponding to the target apparatus; and
   a processor configured to:
   acquire information of a relay device connected to the PLC from the PLC, and display apparatuses capable of being connected to the relay device on a display as selection candidates of the target apparatus;
   receive input of the target apparatus selected from the selection candidates displayed on the display from a user; and
   generate a data collection program for collecting data from the target apparatus by the PLC by using the program templates and the apparatus parameters corresponding to the target apparatus, wherein
   an incorporation column for incorporating processing corresponding to the apparatus parameters is arranged in the program template, and
   the processor generates the data collection program by incorporating the processing corresponding to the apparatus parameters into the incorporation column of the program template, wherein the processing comprises casting processing corresponding to a data length and presence or absence of a code, or performing an endian conversion corresponding to a process data length.

2. The program generation device according to claim 1, wherein
   the processor generates the data collection program comprising a program for controlling communication for acquiring data from the target apparatus.

3. The program generation device according to claim 2, wherein
   the processor generates a database definition program for defining a database which stores collected data by using the program templates and the apparatus parameters corresponding to the target apparatus.

4. The program generation device according to claim 1, which displays a numerical input screen which receives input of at least one of a numerical value and a character string related to the apparatus parameters corresponding to the target apparatus selected from the selection candidates.

5. The program generation device according to claim 1, wherein
   the processor generates a database definition program for defining a database which stores collected data by using the program templates and the apparatus parameters corresponding to the target apparatus.

6. The program generation device according to claim 1, wherein
   the processor receives a correction instruction for the data collection program.

7. A non-transitory computer readable recording medium that records a control program for enabling a computer to function as the program generation device according to claim 1, and enabling the computer to function as the processor.

8. A control method of a program generation device which generates a data collection program enabling a programmable logic controller (PLC) to execute processing related to data collection, wherein program templates corresponding to plural processing related to the data collection and, for each target apparatus from which data is to be collected, apparatus parameters corresponding to the target apparatus are stored in a storage device, the control method comprising:
   acquiring information of a relay device connected to the PLC from the PLC, and displaying apparatuses capable of being connected to the relay device on a display as selection candidates of the target apparatus;
   receiving input of the target apparatus selected from the selection candidates displayed on the display from a user; and
   generating a data collection program for collecting data from the target apparatus by the PLC by using the program templates and the apparatus parameters corresponding to the target apparatus, wherein
   an incorporation column for incorporating processing corresponding to the apparatus parameters is arranged in the program template, and
   the data collection program is generated by incorporating the processing corresponding to the apparatus parameters into the incorporation column of the program template, wherein the processing comprises casting processing corresponding to a data length and presence or absence of a code, or performing an endian conversion corresponding to a process data length.

* * * * *